May 29, 1923.  1,457,025

C. F. GERLINGER
LUMBER CARRIER
Filed March 30, 1922   3 Sheets-Sheet 1

Inventor
C. F. Gerlinger
by his Attorneys

May 29, 1923.

C. F. GERLINGER

LUMBER CARRIER

Filed March 30, 1922

Inventor
C. F. Gerlinger
by his Attorneys

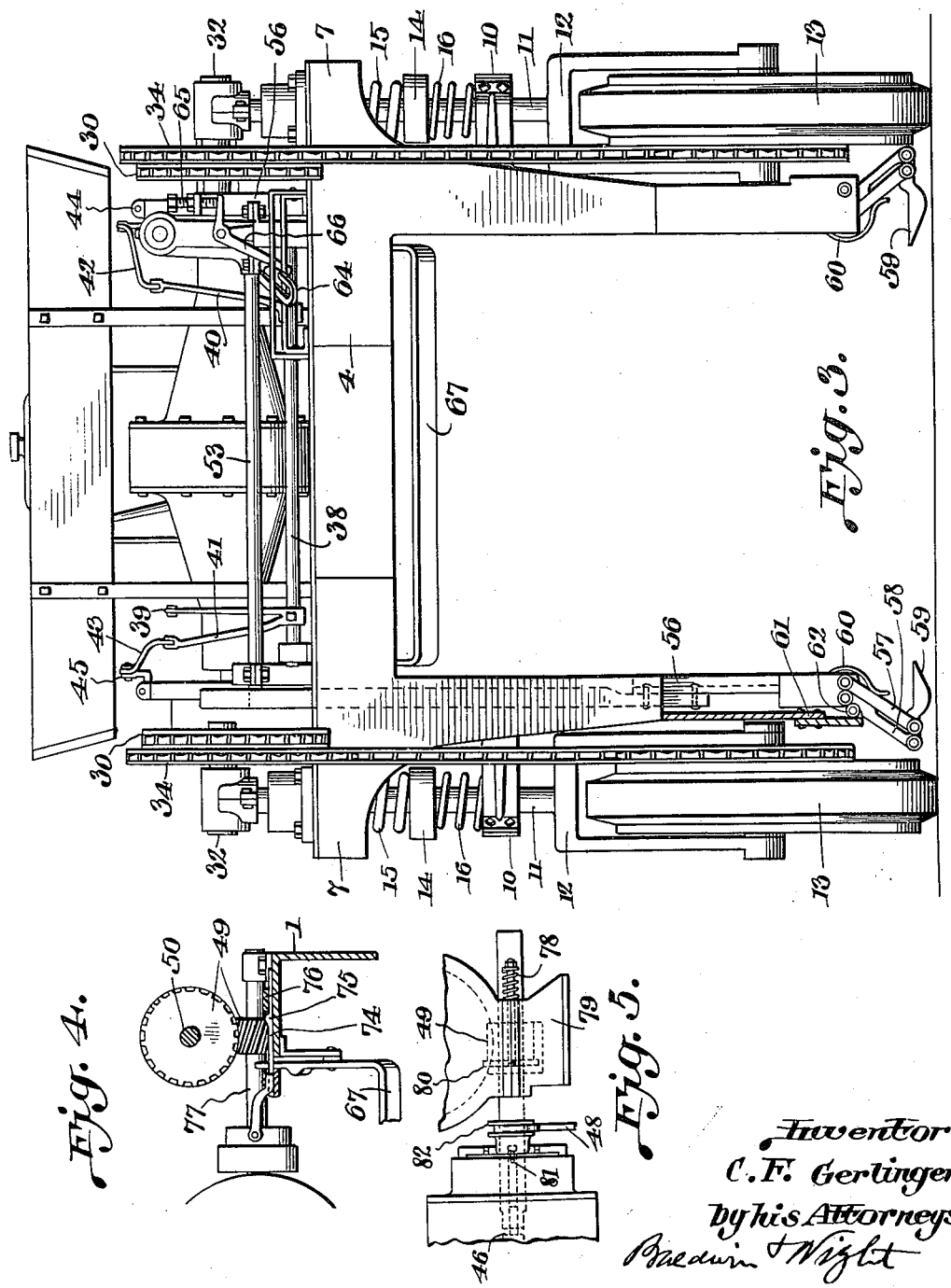

Patented May 29, 1923.

1,457,025

UNITED STATES PATENT OFFICE.

CARL F. GERLINGER, OF DALLAS, OREGON.

LUMBER CARRIER.

Application filed March 30, 1922. Serial No. 548,177.

*To all whom it may concern:*

Be it known that I, CARL F. GERLINGER, a citizen of the United States, and a resident of Dallas, in the county of Polk and State of Oregon, have invented certain new and useful Improvements in Lumber Carriers, of which the following is a full, clear, and exact description.

This invention relates to lumber carriers of the type in which a load of lumber may be raised, carried and deposited in any desired location, and is an improvement upon my Patent 1,422,958, July 18, 1922.

An object of the invention is to provide an improved form of lifting device that will have four lifting points that lift positively and in unison.

Another object is to provide a form of automatic stop for the lifting device that will operate when the limit of movement in either direction is reached, and also apply a brake mechanism.

Another object is to provide an improved form of spring suspension in a vehicle of this character.

Further objects will be apparent from the following detailed description and the appended claims.

In the drawings:

Figure 3 is a rear elevation, also with parts broken away.

Figure 4 is a section on the line 4—4 of Figure 2.

Figure 5 is a view of a detail of certain clutch mechanism.

Figure 1:
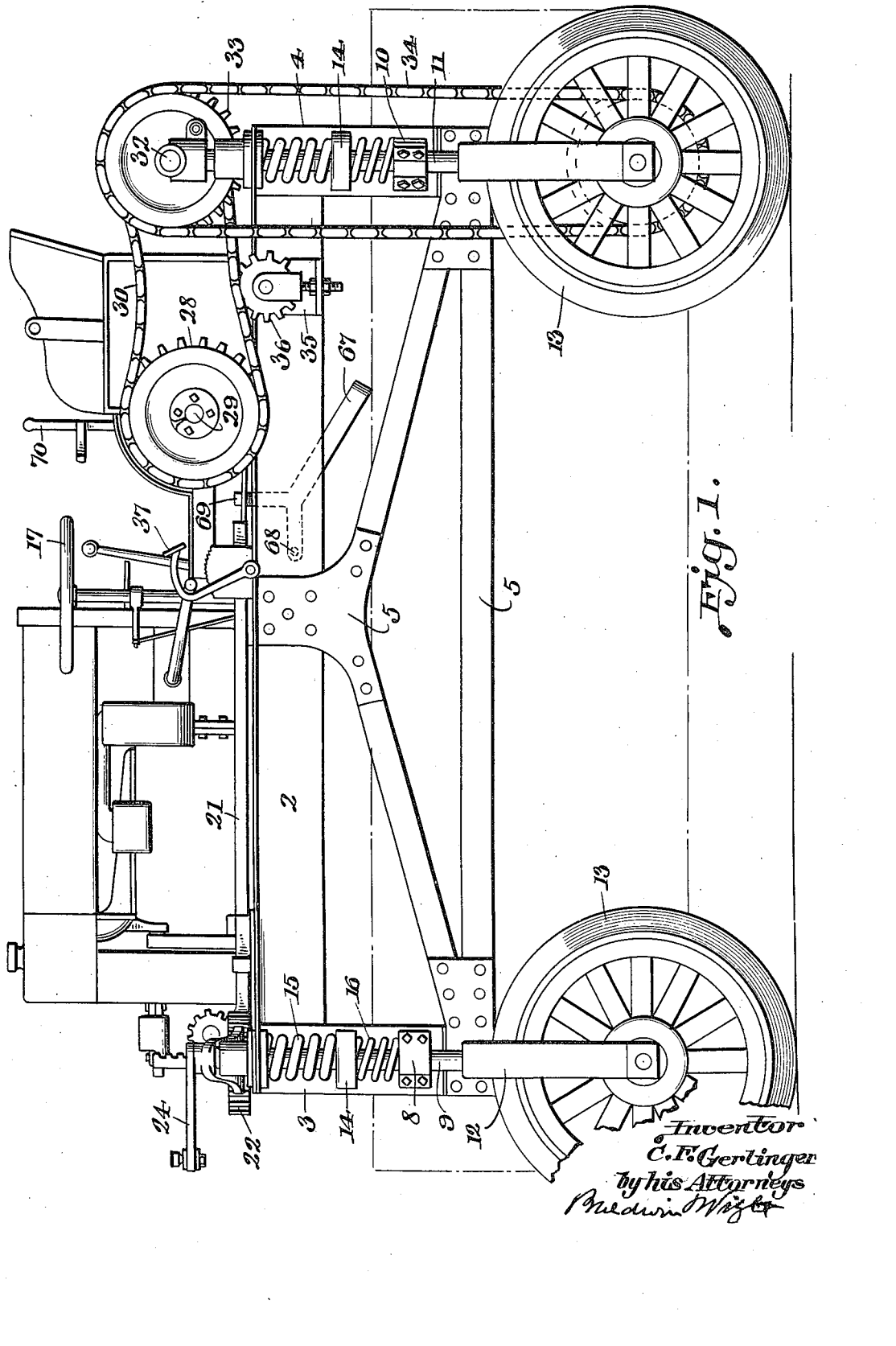
Figure 1 is a side elevation of the carrier.
Figure 2:
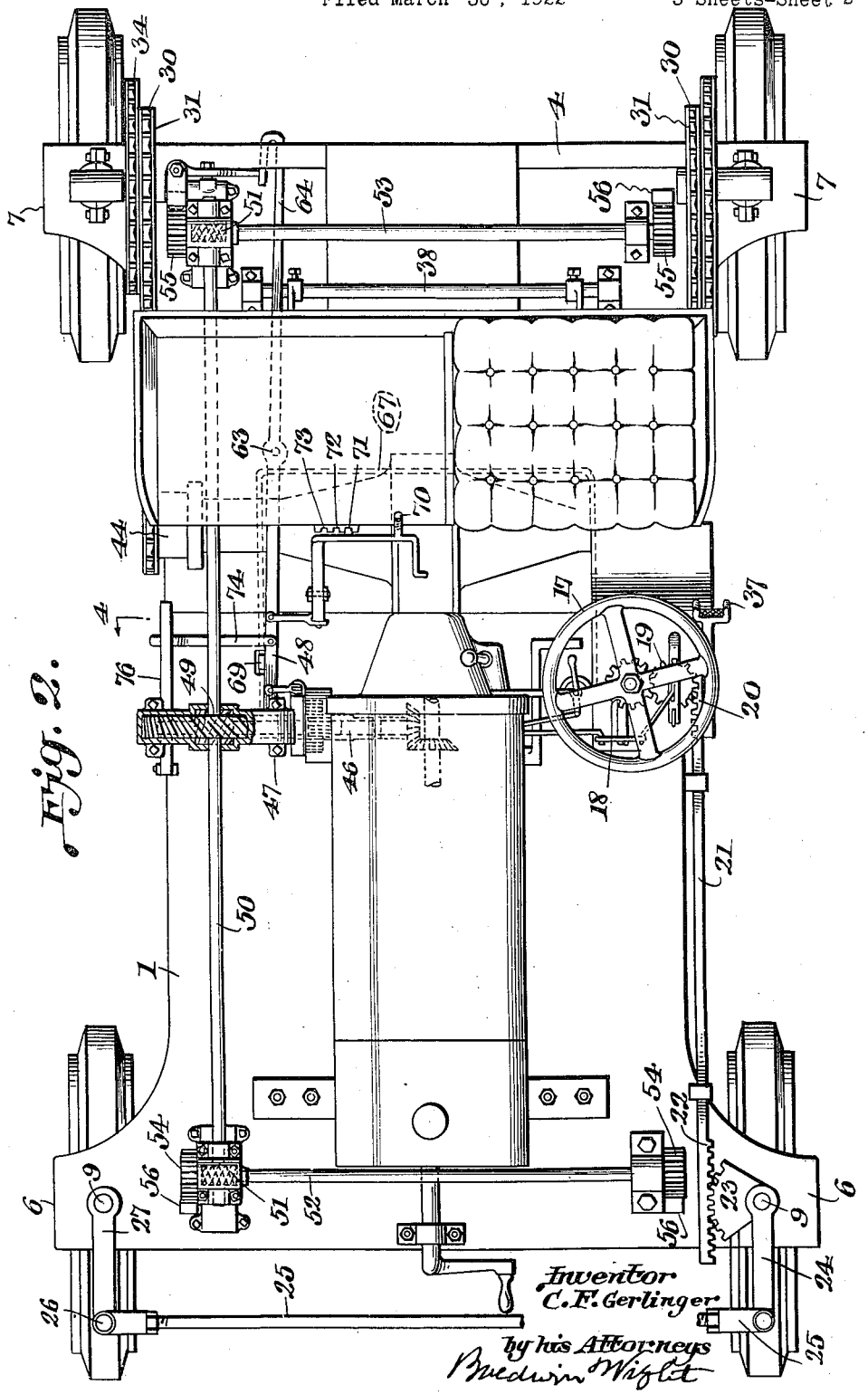
Figure 2 is a top plan view of the same, with parts broken away.

The main frame comprises a top 1, side plates 2, front plate 3 and rear plate 4 together with triangular brace members 5 at the sides. This is preferably constructed of channel and plate construction with angle iron braces, but these features may be varied as desired.

At the front corners the top plate is extended to form brackets 6 and at the rear corners to form similar brackets 7. In the front brackets 6 and in bearings 8 carried by the front members 3 are journalled vertical shafts 9, while in the rear brackets 7 and similar bearings 10 are journalled the rear vertical shafts 11. The lower end of each shaft is rigid with, or integral with a fork 12, and upon an axle in each fork is journalled a wheel 13. Fixed to each shaft approximately midway between the bearings 8 (or 10), and the top plate 1, is a member 14 rigid with the shaft. Between the member 14 and the top plate is a heavy spiral load spring 15, and between the member 14 and the lower bearing 8 (or 10) is a smaller rebound spring 16. This form of spring suspension takes up vibration and load shocks in a simple and efficient manner.

The tractor is steered through the usual steering wheel 17 having a pinion 18 meshing with an intermediate pinion 19 which meshes with teeth 20 on a rack bar 21. At its other end the rack bar is provided with teeth 22 which mesh with a toothed quadrant 23 carried by the upper end of one of the shafts 9. To this shaft is attached an arm 24 which is connected by a cross rod 25 to a similar arm 27 by a pivot 26. This arm 27 is attached to the upper end of the shaft 9 on the opposite side of the machine.

Sprocket wheels 28 are mounted on the main drive shaft 20 and around these pass sprocket chains 30 which also pass around sprocket wheels 31 mounted on stub shafts 32 near the rear of the tractor. On these stub shafts are also mounted sprocket wheels 33 over which pass sprocket chains 34 which extend downwardly and around sprocket wheels connected with the rear wheels 13. A very simple and efficient chain drive is thus provided. On a bracket 35 is adjustably mounted a pinion 36 which engages the chain 30 and by adjustment may be used to tighten the chain. This mechanism is duplicated at each side of the machine but only one is illustrated.

A foot pedal 37 is connected to a shaft 38 by means of an arm 39 thereon. Said shaft has arms 40 and 41 connected by links 42 and 43 to brakes 44 and 45.

The lifting device is operated by the following mechanism. Power is transmitted from the shaft 46 of the engine through a reversible clutch 47 of any desired type operated by clutch lever 48 to worm gearing 49 which operates a longitudinal shaft 50. Near its ends this shaft operates through worm gearing 51 two transverse shafts 52 and 53. The front shaft 52 is provided at its ends with pinions 54 and the rear shaft 53 is provided at its ends with pinions 55. Identical vertical bars 56 are provided with rack teeth at their upper ends which mesh with the pinions 54 and 55. The lower end of each bar 56 has two links 57 and 58 (Fig. 3) carrying lifting shoes 59 which are pressed outwardly by springs 60 when the shoes are in their lower positions. An outer plate 61 of a frame work which guides and protects the bars 56 is provided at its lower end with a roller 62 which engages the outer side of the link 58 when the bars 56 are raised, thus swinging the shoes inwardly.

It is obvious that upon movement of the clutch 47 to the proper position, the shaft 50 may be rotated as desired and this will lift or lower the bars 56. The clutch lever 48 is pivoted at 63 and has a rearwardly extending arm 64. The right hand rear bar 56 has attached thereto at its upper end an adjustable set screw 65 the lower end of which is adapted to engage one arm of a bell crank lever 66 as the bar 56 descends. The other end of the bell crank lever 66 is in position to engage the rear arm 64 of the clutch lever and kick it to neutral position as the load is lowered, thereby automatically cutting out the power from the shaft 50, and stopping the movement of the bars 56 when they have reached the position shown in Figure 3.

A member 67 extends across the machine in position to be engaged by the load as it rises and is pivoted at 68. It has an arm with a cam shaped upper end 69 which engages the clutch lever on its upward movement and throws it to neutral position, thereby stopping the movement of the lifting mechanism as explained above for the downward movement.

A hand lever 70 is adapted to operate the clutch lever 48, and a detent carried thereby may engage either of three notches 71, 72 and 73. The central notch is neutral, and whenever the lever is set to either of the other notches causing movement of the lifting device in one or the other direction, the automatic mechanism described above will kick the clutch lever into neutral position at the termination of the movement of the lifting mechanism to desired position.

Pivoted to the clutch lever is a lever 74 provided with a cam 75 which when the clutch is in operative position lies on one or the other side of a lever 76 pivoted at its outer end and adapted to apply a braking pressure to the shaft 77 of the driving gearing. When the clutch is thrown to neutral by manual or automatic means, the cam 75 raises the lever 76 and applies the brakes.

A coiled spring or springs 78 are set in the outer housing 79 of the clutch shaft bearing secured to plate ring 80 fitting over the shaft. These springs are set at about one and a half tons more than the carrier should be required to lift. Whenever the device is overloaded beyond the point of safety, the springs will permit the clutch to slide on its shaft until the shifting cone member 82 of the clutch and a pin 81 extending through the shaft come into contact with each other, automatically throwing the clutch to a neutral position.

Any desired form or reversible clutch may be used and any old or common form of brake for the driving mechanism of the lifting device, and therefore it has not been thought necessary to illustrate the details of any specific clutch or brake mechanism. Other details may be varied in their form and location, and in general the invention is intended to be limited only by the scope of the appended claims.

I claim as my invention:

1. A lumber carrier comprising a frame, vertically movable rack bars, guides therefor on said frame, lifting shoes, a pair of links pivotally connecting each shoe to its rack bar, a single spring connected to said rack bar and bearing at its end against one of said links to move the pair outwardly when lowered below said guide, and a roller mounted on said guide and engaging one of the links to facilitate the upward and downward movement of the rack bar.

2. A lumber carrier comprising a frame, an engine driven shaft thereon, a longitudinal shaft, reversible clutch means connecting the two shafts to turn the longitudinal shaft in either direction or allow it to remain idle, transverse shafts connected to the ends of the longitudinal shaft, rack bars geared to the ends of the transverse shafts, and means for throwing the clutch to neutral position at a time when the rack bars have been moved a predetermined distance in either direction.

3. A lumber carrier comprising a frame, an engine driven shaft thereon, a longitudinal shaft, reversible clutch means connecting the two shafts to turn the longitudinal shaft in either direction or allow it to remain idle, transverse shafts connected to the ends of the longitudinal shaft, rack bars geared to the ends of the transverse shafts, means for throwing the clutch to neutral position at a time when the rack bars have been moved a predetermined distance in either direction, and means for automatically applying a brake when the clutch is so moved.

4. A lumber carrier comprising a frame, load lifting means mounted therein, means for transmitting motion from a source of power to the load lifting means comprising a clutch that can be set in neutral position or to cause the load lifting means to move in either direction, means for manually moving the clutch to operative position, automatic means for moving the clutch to neutral position upon a movement of the load lifting means to a predetermined extent in either direction, and means for braking the transmitting means whenever the clutch is moved to neutral position.

5. A lumber carrier comprising a frame, a load lifting means mounted therein, means for transmitting power to the load lifting means comprising a clutch, means for moving the clutch to neutral position at a time when the load lifting means has moved to a predetermined extent in either direction, a spring mounted to yield if too great a strain is applied to the load lifting means, and means whereby the yielding of the spring throws the clutch to neutral position.

6. A lumber carrier comprising a frame, a load lifting means mounted therein, power means, connections between the power means and the lifting means comprising a clutch, and means whereby the clutch will be automatically moved to neutral position at a time when the load lifting means has moved to a predetermined extent in either direction, and also when too great a strain has been applied to the load lifting means.

In testimony whereof, I have hereunto subscribed my name.

CARL F. GERLINGER.